Figure 1:
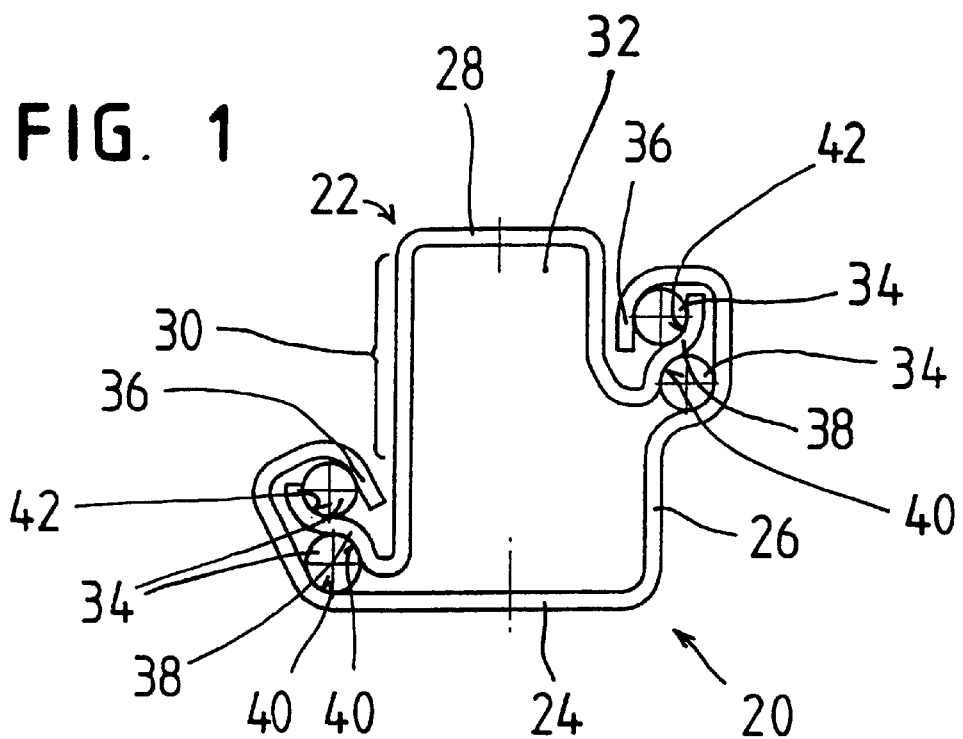

United States Patent
Bauer et al.

[11] Patent Number: 6,059,248
[45] Date of Patent: May 9, 2000

[54] LONGITUDINAL GUIDANCE FOR A MOTOR VEHICLE SEAT WITH TWO LONGITUDINAL RAILS AND GUIDING MEANS

[75] Inventors: Heinz Bauer; Burckhard Becker; Ernst-Reiner Frohnhaus, all of Solingen, Germany

[73] Assignee: C. Rob. Hammerstein GmbH & Co KG., Solingen, Germany

[21] Appl. No.: 09/067,081

[22] Filed: Apr. 27, 1998

[30] Foreign Application Priority Data

Apr. 26, 1997 [DE] Germany .................. 197 17 667

[51] Int. Cl.⁷ .................................................. F16M 13/00
[52] U.S. Cl. ............................................. 248/430; 248/429
[58] Field of Search .................... 248/430, 429

[56] References Cited

U.S. PATENT DOCUMENTS

| | | | |
|---|---|---|---|
| 3,157,441 | 11/1964 | Pickles | 248/429 |
| 4,725,032 | 2/1988 | Kazaoka et al. | 248/430 |
| 4,863,289 | 9/1989 | Lecerf | 248/430 |
| 4,901,421 | 2/1990 | Takarabe et al. | 248/430 |
| 4,969,622 | 11/1990 | Munchow et al. | 248/429 |
| 5,011,209 | 4/1991 | Takarabe et al. | 248/430 |
| 5,137,244 | 8/1992 | Negi | 248/430 |
| 5,219,230 | 6/1993 | Babbs | 248/430 |
| 5,222,814 | 6/1993 | Boelryk | 248/430 |
| 5,481,941 | 1/1996 | Premji | 248/430 |
| 5,848,775 | 12/1998 | Isomura et al. | 248/430 |
| 5,855,350 | 1/1999 | Volker et al. | 248/430 |

FOREIGN PATENT DOCUMENTS

| | | | |
|---|---|---|---|
| 2282349 | 3/1976 | France | 248/430 |
| 2446740 | 9/1980 | France | 248/430 |
| 404310437 | 11/1992 | Japan | 248/430 |
| 2128472 | 5/1984 | United Kingdom | 248/429 |
| 2219733 | 12/1989 | United Kingdom | 248/430 |

*Primary Examiner*—Anita M. King
*Assistant Examiner*—Debbie Short
*Attorney, Agent, or Firm*—John Lezdey & Assoc

[57] ABSTRACT

The invention relates to a longitudinal guidance for vehicle seats, especially motor vehicle seats, with two longitudinal rails, namely a bottom rail and a seat rail, and with a guiding structure in the shape of roll bodies and/or sliding bodies, which are arranged between the rail. Each rail has an L-shape area, which has two L-legs. Each rail also has two final areas, which join the respective L-shape area, which extend bent several times and onto which the guiding structures are joined. Each final area of each rail creates an encompassing area with each final area of the other rail by a reciprocal interlocking. In each encompassing area, seen from the direction of the profile, two channels for guiding structures are provided.

15 Claims, 1 Drawing Sheet

LONGITUDINAL GUIDANCE FOR A MOTOR VEHICLE SEAT WITH TWO LONGITUDINAL RAILS AND GUIDING MEANS

FIELD OF THE INVENTION

The invention relates to a longitudinal guidance for vehicle seats, especially motor vehicle seats, with two longitudinal rails, namely a bottom rail and a seat rail, and with guiding means in the shape of roll- and/or sliding bodies, which are arranged between the rails, whereas each rail, seen in profile, has a) an L-shape area respectively, which is constituted by two L-legs and b) two final areas, which connect to the L-shape area respectively, which extend bent several times and onto which guiding means are joined and whereas furthermore, each final area of a rail constitutes an encompassing area with each final area of the other rail by a reciprocal interlocking.

DESCRIPTION OF PRIOR ART

With this longitudinal guidance of the above mentioned kind known from the German printed patent specification 31 43 431 only one channel is provided in each case for guiding means in each encompassing area. This longitudinal guidance has generally proven satisfactory. It embodies a closed interior, which is limited by the rails, and which has no guiding means. This interior can be used for things to be built in, for example for a motoric adjustment drive of the longitudinal guidance. Due to the two encompassing areas, which are arranged at those places of the profile, which are as different and as opposite as possible, a high pull-out resistance and by this a security with regard to pressures caused by an accident is achieved.

With the longitudinal guidance of the above mentioned kind known from the German printed patent specification 24 51 262, the two rails are arranged respectively next to each other in the encompassing areas on one hand by roll bodies and on the other hand via sliding sections. Sliding sections have not proven to be satisfactory, especially with light metal profiles special precautions for sliding sections are required.

With the longitudinal guidance according to the European patent application 76 041 balls are each arranged on a channel in the two encompassing areas. These are not sufficient however, additional guiding means in the shape of cylindrical roll bodies are provided between the two rails.

SUMMARY OF THE INVENTION

It is the purpose of the invention to improve the longitudinal guidance of the above mentioned kind. It is the object of the invention to improve this known longitudinal guidance in such a way that a more precise guidance of the two rails into each other is made possible, especially that the guidance within the one encompassing area is far more independent from the alterations in the remaining area of the rails, for example in the other encompassing area, in the angular position of the two L-legs of an L-shape area towards each other or by the pressure of the longitudinal guidance.

This object is realized based on the longitudinal guidance of the above mentioned kind in such a way that in each encompassing area seen in profile two channels are provided respectively for guiding means, especially for balls.

Based on the two channels for guiding means within each encompassing area, a precise guidance in each encompassing area is achieved. Each individual encompassing area can be embodied in such a way that it could constitute a longitudinal guidance completely by itself. The guidance characteristics within each encompassing area are therefore mostly independent from the influences onto the rails of the longitudinal guidance, for example a pressure by weight, a side deformation or a tilting of the rails towards each other. The longitudinal guidance according to the invention can therefore be twisted around its longitudinal axis in the state of assembly and it can therefore be adjusted better onto frames of vehicles, which are subject to tolerances, than this has been the case with the longitudinal guidances known prior to this date.

Based on the two channels for guiding means, which are preferably embodied as balls, sufficient guiding means are always provided for all kinds of different cases of pressure, as for example with pressure of the longitudinal guidance by the weight of a passenger and a motor vehicle seat on one hand and pressure caused by an accident in the sense of a separation of the two rails on the other hand, which assure a univocal allocation to the final areas in the cases of use and comprise a large elastic loose.

It has proven to be especially advantageous to embody one rail, preferably the bottom rail, as an encompassing rail, which encompass the free profile ends of the profile of the other respective rail. The encompassing rail is thereby preferably embodied in an elastic manner and prestressed elastically in such a way that its two profile ends spring towards each other. In the same manner the encompassed rail can be elastically embodied in such a way that its two free profile ends spring away from each other.

It has proven to be advantageous to embody the free profile ends of the encompassing rail, preferably the seat rail actually, bent in an S-shape and to provide there the two guidance cannelures of the channels for the guiding means, which are preferably embodied as balls. This leads to a precise restraint of the free profile ends and enables an elastic prestress within these free profile ends, in such a way that the two rows of balls of the corresponding encompassing areas are in an alignment respectively and do therefore not make any noise.

Furthermore, it has proven to be advantageous, especially in combination with the last mentioned characteristic, to embody each of the two final areas of the encompassing rail bent several times. It is advantageous to have a sequence of individual bends in the same sense of direction respectively. Hereby, the inner surfaces of two bends are provided as grooves of the channels for the guiding means, namely especially the balls. Due to these several bends of the final areas it is possible, to embody the final areas as an elastic clamp, for example as a U-shape clamp, which elastically keep the guiding means, which are located in them, as well as the projecting part of the final part of the other rail under elastic prestress. By this each individual encompassing area is elastically prestressed for itself and therefore more strongly independent from the relative positions of other sections of the profile.

The two encompassing areas are provided at different positions, if possible, of the total profile. It has proven to be advantageous to provide at least one encompassing area in a corner section of the essentially box-shape profile of the longitudinal guidance.

The two rows of balls of each encompassing area are preferably in a close vicinity, preferably their distance is smaller than the diameter of an individual ball. By this, the encompassing areas can be embodied relatively small, and do therefore not take up too much space.

Finally it has proven to be advantageous to arrange that one of the two rows of balls of each encompassing area, which is arranged essentially in the direction of the pressure with a pressure by weight of the longitudinal guidance, in the larger distance of the respective free profile ends of the rail profile than the second row of balls and thereby the second channel. With the normal pressure of the longitudinal guidance, namely the pressure by weight of a passenger and a motor vehicle seat, by this a better support and a more favorable guidance are achieved.

Further advantages and characteristics of the invention derive from the other claims as well as the following decription of the non-restrictive embodiments of the invention, which are illustrated further with regard to the drawing. This drawing shows in:

FIG. 1: a front view of a longitudinal guidance in a first embodiment and

Figure 2:
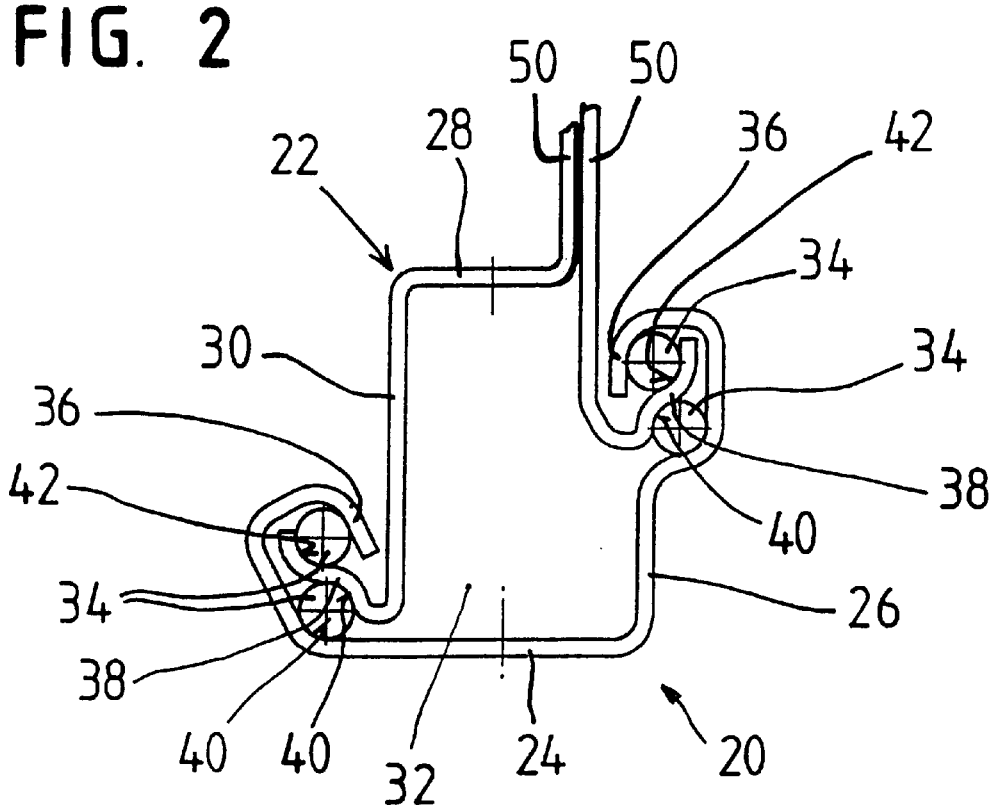

FIG. 2: a front view according to FIG. 1, but now with a two-part seat rail.

The longitudinal guidance consists of two rails, namely a bottom rail 20, also called low rail and a seat rail 22 also called top rail. In all embodiments the rail profiles are embodied without a profile branching, can be produced therefore by the shaping of a steel plate blank, for example by bending, stamping, rolling or the same. Even if a steel plate is preferred as a material for the rails 20, 22, this does not exclude the use of a light metal, for example aluminum. The rail profiles can also be embodied in a mixed style, for example the bottom rail 20 as an aluminum profile, the seat rail 22 as a steel plate profile.

Seen from the direction of its profile, each rail 20, 22 has an L-shape area in respectively, located in about the center of its profile blank, which is constituted from two L-legs in each case, namely the L-legs 24 and 26 of the bottom rail 20 and the L-legs 28, 30 and the seat rail 22. In the illustrated embodiment, the two legs are located in a right angle towards each other. Each L-leg of a rail is parallel to an L-leg of the other rail each, the L-leg 24 is parallel to the L-leg 28. It is essentially the Legs, which limit a free interior within the rail profiles. This free interior, which is described as a longitudinal channel 32, can be used for things to be fitted in. It is completely free of any guiding means. The invention offers the possibility to embody this channel in such a way that it is adjusted to each respective purpose of use of the longitudinal guidance. That way relatively large free cross sections can be realized, for example relatively high and/or relatively wide longitudinal channels. The individual shaping of the L-shape areas is mostly up to the discretion of the engineer, for example the L-shape legs can comprise corner moldings, bends and the same. Also the angle, which is constituted by the legs, for example the legs 24, 26, can clearly differ from 90 degrees.

Seen from the profile, to each L-leg 24 to 30 a final area is joined in each case. Altogether each rail 20, 22 has therefore two final areas. The final areas can leave the respective L-leg in an angle, but they can also start in the same direction as the respective L-leg. Basically, the final areas have an essentially hook-shape embodiment on one hand, and on the other hand guiding means 34 are adjacent to them. Altogether four channels are provided for the guiding means 34, which are embodied as balls. All balls of the four channels have the same diameter.

To each final area, a free leg 36, 38 is allocated, furthermore two cannelures 40,42 are embodied in each case for the balls 34 in each final area.

The free leg 38 of the seat rail 22 is bent in an S-shape manner, respectively. The balls 34 are adjacent to the inside bends, here the cannelures 40,42 are embodied. In both encompassing areas the final area of the bottom rail 20 embraces the two rows of balls in each case, which belong to the respective encompassing area, furthermore it encompasses the free leg 38 of the seat rail 22. The two rows of balls are located at different sides of the free legs 38. The two rows of balls are in close vicinity, their distance is smaller than the diameter of the ball, even smaller than the radius of the ball. The balls are essentially placed vertically on top of each other, the divergence is less than 20 degrees.

In the embodiment, the two encompassing areas are arranged outside a space, which is limited by the L-profiles and which can be essentially described as a rectangle. Alternatively at least one encompassing area can be moved into the already described rectangle.

In the following, the encompassing area, which is illustrated at the bottom left of FIG. 1, is described: For the embodiment of this encompassing area, the final area of the seat rail 20 is bent three times altogether in the same sense of direction, due to this it is of an essentially C-shape. The pertaining final area of the seat rail 22 extends essentially in a V-shape manner, a V-leg is constituted by the free leg 38 and has the already mentioned S-shape embodiment, the V-leg extends in a direct extension of the L-leg 28. The free legs 36, 38 engage each in a hook type area, which is constituted by the final area of the other rail.

The other encompassing area, which is located on a diagonal opposite the already mentioned encompassing area, is mostly in accordance concerning shape, so that the two encompassing areas are essentially of the same construction. Only the transfers to the L-legs are different. The final area of the bottom rail 20 is, departing from the free leg 36, also bent three times in the same direction, but after that a bend in the opposite direction follows. Again, the free legs 36, 38 respectively engage into hook type areas, which are embodied by the pertaining final areas of the respective other rail.

In case of a pressure by weight of the bottom rail 20, the respective lower balls 34, illustrated in the figure, carry in each encompassing area. These balls are in a further distance from the free end of the profile than the respective second row of balls. Furthermore, that part of the final area of the seat rail 22, which is bent in a V-shaped manner, where the transfer between the two V-legs occurs, is located in the direct vicinity of the respective lower ball 34. Expressed in other words, the tip of the V is directly next to the respective lower ball, namely misaligned to the center of the profile, the distance corresponds to about a diameter of a ball.

In the embodiment according to FIG. 2 different to that of FIG. 1, the seat rail 22 is constituted of two individual profile elements. The division has occurred thereby at the point of transfer between the L-leg 28 and the final area of the seat rail 22. Each individual profile has a flange 50, which extends to the top and onto which an attachment may occur and/or onto which extensions may be attached. At the end of the L-leg 28 a rectangular bend to the top occurs, by this the left flange 50 is embodied. The interior leg of the right final area is extended in the same direction, by this the right flange 50 is embodied. The two flanges 50 extend in a parallel way in the illustrated embodiment, but this does not have to be the case necessarily. It is important that both flanges are rigidly connected with each other, as illustrated for example.

For the practical use, seat rail and bottom rail may exchange their function. The longitudinal guidance may also be mounted turned by other angles than zero degrees (as in the illustration) or by 180 degrees, for example in an angle of 90 degrees.

What is claimed is:

1. A longitudinal guidance for vehicle seats having a longitudinal bottom rail and a longitudinal seat rail, and having guiding means in the form of balls, which are arranged between said bottom rail and said seat rails, wherein each said bottom rail and said seat rail is comprised of and L-shaped area, said L-shaped area having two L-legs, each said bottom rail and said seat rail further comprising two final areas, each said final area being connected to the respective said L-shaped area having two L-legs, each said bottom rail and said seat rail further comprising two final areas, each said final being connected to the respective said L-shaped area, each said final area extending bent several times, said guiding means are being allocated to said final areas each said final area of said bottom rail reciprocally interlocking each said final area of said seat rail in an encompassing area, and each said encompassing area comprising two channels for said guiding means, one said rail being an encompassing rail, said encompassing rail encompassing the free profile ends of the profile of the other said rail seen from the direction of the profile, the said channels comprise cannelures, and wherein the free profile ends of said encompassing rail extend bent in a S-shaped manner and embody said cannelures.

2. The longitudinal guidance according to claim 1 wherein each said final area of said encompassing rail comprises a plurality of bends in the same respective direction, and wherein the inside surfaces of two said bends of each final area comprise grooves for said channels for said guiding means.

3. The longitudinal guidance according to claim 1 wherein each said final area of the encompassing rail departing from the profile end is bent two times in the same respective direction.

4. The longitudinal guidance according to claim 1 wherein each said final area of said encompassing rail comprises an elastic prestress that closes the respective final area.

5. The longitudinal guidance according to claim 1 wherein said balls have a spacing from each other that is smaller than the diameter of an individual ball.

6. The longitudinal guidance according to claim 1 wherein said balls are prestressed.

7. The longitudinal guidance according to claim 1 wherein each said L-leg of one said rail extends parallel to said L-leg of the other said rail.

8. The longitudinal guidance according to claim 1 wherein in said seat rail seen in the direction of the profile, said ball that is most distant from the free profile end is adjacent to an exterior surface of said final area and that an area of the profile that is away from the free profile ends is bent by nearly 180 degrees.

9. The longitudinal guidance according to claim 1 wherein said encompassing rail is said bottom rail.

10. The longitudinal guidance according to claim 1 wherein said encompassing rail is said seat rail.

11. The longitudinal guidance according to claim 1 wherein said encompassing rail is said bottom rail.

12. The longitudinal guidance according to claim 3 wherein said encompassing rail is said bottom rail.

13. The longitudinal guidance according to claim 3 wherein each said final area is bent in an arrow shape by 90 degrees.

14. The longitudinal guidance according to claim 3 wherein said encompassing rail is said bottom rail.

15. The longitudinal guidance according to claim 1 wherein said guiding means is in the form of sliding bodies.

* * * * *